United States Patent
Sato et al.

(10) Patent No.: US 12,331,206 B2
(45) Date of Patent: Jun. 17, 2025

(54) AQUEOUS INKJET INK COMPOSITION

(71) Applicant: SAKATA INX CORPORATION, Osaka (JP)

(72) Inventors: Yoichi Sato, Osaka (JP); Hiroyuki Konishi, Osaka (JP); Kazuki Moriyasu, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 18/747,139

(22) Filed: Jun. 18, 2024

(65) Prior Publication Data

US 2024/0336795 A1   Oct. 10, 2024

Related U.S. Application Data

(63) Continuation of application No. 17/278,635, filed as application No. PCT/JP2019/035205 on Sep. 6, 2019, now Pat. No. 12,104,067.

(30) Foreign Application Priority Data

Oct. 1, 2018   (JP) ................. 2018-186993

(51) Int. Cl.
| | | |
|---|---|---|
| C09D 11/00 | (2014.01) | |
| C08K 3/22 | (2006.01) | |
| C08K 5/053 | (2006.01) | |
| C08K 5/17 | (2006.01) | |
| C09D 11/107 | (2014.01) | |
| C09D 11/108 | (2014.01) | |
| C09D 11/12 | (2006.01) | |
| C09D 11/324 | (2014.01) | |
| C09D 11/38 | (2014.01) | |

(52) U.S. Cl.
CPC ............. *C09D 11/324* (2013.01); *C08K 3/22* (2013.01); *C08K 5/053* (2013.01); *C08K 5/17* (2013.01); *C09D 11/107* (2013.01); *C09D 11/108* (2013.01); *C09D 11/12* (2013.01); *C09D 11/38* (2013.01)

(58) Field of Classification Search
CPC ... C09D 11/324; C09D 11/107; C09D 11/108; C09D 11/12; C09D 11/38; C08K 3/22; C08K 5/53; C08K 5/17
USPC ........................ 106/31.01, 31.13, 31.6, 31.85
See application file for complete search history.

(56) References Cited

U.S. PATENT DOCUMENTS

| | | |
|---|---|---|
| 2010/0222498 A1 | 9/2010 | Yatake et al. |
| 2014/0152741 A1 | 6/2014 | Nakane et al. |
| 2015/0225586 A1 | 8/2015 | Ingle et al. |
| 2017/0002216 A1 | 1/2017 | Sato et al. |
| 2018/0030298 A1 | 2/2018 | Yamazaki et al. |
| 2018/0273789 A1 | 9/2018 | Matsuzaki et al. |
| 2020/0199387 A1 | 6/2020 | Utsugi et al. |

FOREIGN PATENT DOCUMENTS

| | | | |
|---|---|---|---|
| JP | 2011026545 A | 2/2011 | |
| JP | 2011074336 A | 4/2011 | |
| JP | 2011094082 A | 5/2011 | |
| JP | 2015137318 A | 7/2015 | |
| JP | 2016176016 A | 10/2016 | |
| JP | 2018203802 A | 12/2018 | |
| WO | 2015111644 A1 | 7/2015 | |
| WO | WO-2015111611 A1 * | 7/2015 | ............... C07C 1/20 |

OTHER PUBLICATIONS

Notice of Allowance issued by U.S. Patent and Trademark Office, dated Aug. 26, 2024, for U.S. related U.S. Appl. No. 17/278,635 (9 pages).
Extended European Search Report (EESR) dated Jan. 27, 2023, issued for divisional application (EP22203854.9) of European counterpart patent application No. EP19869858.1 (9 pages).
Extended European Search Report (EESR) dated May 6, 2022, issued for European counterpart patent application No. EP19869858.1 (7 pages).
International Search Report (ISR) mailed Oct. 8, 2019, issued for International application No. PCT/JP2019/035205. (1 page).
Non-Final Office Action issued by U.S. Patent and Trademark Office, dated Apr. 18, 2024, for U.S. related U.S. Appl. No. 17/278,635 (22 pages).
Notification Concerning Transmittal of International Preliminary Report on Patentability (PCT/IB/326) and Notification of Transmittal of Translation of the International Preliminary Report on Patentability (PCT/IB/338) mailed Apr. 15, 2021, with International Preliminary Report on Patentability (PCT/IB/373) and Written Opinion of the International Searching Authority (PCT/ISA/237), for corresponding international application PCT/JP2019/035205 (12 pages).

\* cited by examiner

*Primary Examiner* — James E McDonough
(74) *Attorney, Agent, or Firm* — Law Office of Katsuhiro Arai

(57) ABSTRACT

An aqueous inkjet ink composition contains a pigment, an alkali-soluble resin, a polyolefin resin emulsion, a basic compound, an aqueous medium, and a surfactant, wherein the alkali-soluble resin is a copolymer of acrylic acid/lauryl acrylate/styrene; a glass transition temperature of the alkali-soluble resin is 45° C. to 95° C.; an average grain size of the polyolefin resin emulsion is 5 to 300 nm; a solids content of the polyolefin resin emulsion is 0.5 to 5.0 percent by mass in the aqueous inkjet ink composition; and the surfactant contains at least an acetylenediol-based surfactant. The aqueous inkjet ink composition is adapted to offering excellent high-gap discharge stability, antifouling property, adhesion, drying property, abrasion resistance, discharge stability, and preservation stability, even when printed on nonabsorbent media.

6 Claims, No Drawings

AQUEOUS INKJET INK COMPOSITION

CROSS-REFERENCE TO RELATED APPLICATIONS

This application is a continuation of U.S. patent application Ser. No. 17/278,635, filed Mar. 22, 2021, and claims the benefits thereof under 35 U.S.C. § 121 or § 365(c), which is the U.S. National Phase under 35 U.S.C. § 371 of International Application PCT/JP2019/035205, filed Sep. 6, 2019, which claims priority to Japanese Patent Application No. 2018-186993, filed Oct. 1, 2018, each disclosure of which is herein incorporated by reference in its entirety. The International Application was published under PCT Article 21(2) in the language other than English.

The applicant herein explicitly rescinds and retracts any prior disclaimers or disavowals or any amendment/statement otherwise limiting claim scope made in any parent, child or related prosecution history with regard to any subject matter supported by the present application.

TECHNICAL FIELD

The present invention relates to an aqueous inkjet ink composition offering excellent drying property, abrasion resistance of printed matters, discharge stability, and preservation stability, even when printed on coated papers, polyvinyl chloride sheets, and other nonabsorbent media.

BACKGROUND ART

Inkjet printing/recording methods refer to printing/recording methods whereby ink droplets are directly discharged and deposited onto base printing/recording materials from very fine nozzles to obtain text and images.

The aqueous inkjet printing method has traditionally been considered unsuitable for manufacturing of large quantities of printed matters due to such problems as longer printing time attributable to use of scanning-type print heads, as well as slow drying of aqueous media.

On the other hand, however, this method presents advantages in that it eliminates the platemaking process necessary under standard printing methods, and only requires very simple system configurations to perform printing, even when the electrophotographic method is included, and therefore its applications have so far been primarily in the realm of personal use.

What this means is that, if the aforementioned problems of time-consuming printing and drying processes, etc., can be resolved, it is more than worthwhile to use the aqueous inkjet printing method also in industrial applications, such as office and commercial printing, as a competitor to other printing methods. For this reason, arts of increasing the printing speed and applying low-cost printing sheets are actively studied in recent years, in the contexts of both printing systems and inks, so that the inkjet printing method can be utilized in industrial applications.

Also, in the area of industrial applications, studies are underway to utilize not only affordable plain papers, standard offset papers, and other types of uncoated papers, but also coated papers, polyvinyl chloride sheets, and other nonabsorbent media, as base printing materials. On these media, aqueous inks do not wet/spread or dry easily, which means that the inks used in multi-color printing will mix together and smudge or the dots will clump up and create mottled patterns in solid image areas requiring a uniform concentration. Also, the inks do not permeate easily into the media, resulting in poor resistance, such as abrasion resistance, of the printed matters. These problems require remedial measures because they reduce the value of the printed matters. Additionally, preservation stability, discharge stability defined by stable discharge without clogged nozzles, and jetting property of droplets, which are among the ink performances required under any inkjet recording method as originally intended, must also be ensured.

It is cited in Patent Literatures 1 and 2 that, as aqueous inks with which to form images on nonabsorbent media, use of water-soluble resins having specific structures can achieve excellent coating film resistance as well as excellent image quality accompanied by high gloss on polyvinyl chloride sheets. However, problems still remain even when these inks are used, such as poor drying property on polyvinyl chloride sheets as well as likelihood of ink discharge becoming unstable and thereby causing printing disturbances. Also, the water-soluble resins do not have sufficient film-forming property, which makes it difficult to form ink coating films that can withstand strong rubbing.

In Patent Literature 3, improvement in both printing quality and abrasion resistance was recognized as a result of using an aqueous black ink containing a carbon black of specific pH, a pigment dispersant with acid value, an aqueous resin having amine-neutralized acid groups, and a specific water-soluble solvent. Under this method, however, the medium must be heated from its back side, which presents a concern that the printing quality may change due to temperature variation, as well as a problem that the system configuration will become complicated.

In Patent Literature 4, improvement in drying property, abrasion resistance, discharge stability, and preservation stability, was recognized as a result of using an alkali-soluble resin having a specific glass transition temperature. However, this method leads to insufficient discharge stability, as well as antifouling property of the printed matters, in the case of a high gap (printing mode in which the distance between the ink discharge nozzle and the printed medium is longer than normal).

As described above, the current reality is that, while utilization of coated papers, polyvinyl chloride sheets and other nonabsorbent media is being studied as printing media for the aqueous inkjet printing method, it is difficult to obtain aqueous inkjet ink compositions offering excellent drying property, excellent abrasion resistance of the printed matters, and good adhesion, discharge stability, preservation stability, high-gap discharge stability, antifouling property, and adhesion.

BACKGROUND ART LITERATURE

Patent Literature

Patent Literature 1: Japanese Patent Laid-open No. 2011-026545
Patent Literature 2: Japanese Patent Laid-open No. 2011-094082
Patent Literature 3: Japanese Patent Laid-open No. 2011-074336
Patent Literature 4: Japanese Patent Laid-open No. 2015-137318

SUMMARY OF THE INVENTION

Problems to be Solved by the Invention

An object of the present invention is to provide an aqueous inkjet ink composition offering excellent preservation stability and discharge stability, as well as excellent high-gap discharge stability, antifouling property, adhesion, drying property, and abrasion resistance, even when printed on nonabsorbent media (coated papers, polyvinyl chloride sheets, etc.)

Means for Solving the Problems

As a result of earnest studies to achieve the aforementioned object, the inventors of the present invention invented the aqueous inkjet ink composition as described below.
(1) An aqueous inkjet ink composition containing a pigment, an alkali-soluble resin, a polyolefin resin emulsion, a basic compound, an aqueous medium, and a surfactant, wherein the glass transition temperature of the alkali-soluble resin is 40 to 100° C., the average grain size of the polyolefin resin emulsion is 5 to 300 nm, the solids content of the polyolefin resin emulsion is 0.5 to 5.0 percent by mass in the aqueous inkjet ink composition, and the surfactant contains at least an acetylenediol-based surfactant.
(2) The aqueous inkjet ink composition according to (1), wherein the content of the pigment is 2.0 to 6.0 percent by mass in the aqueous inkjet ink composition.
(3) The aqueous inkjet ink composition according to (1) or (2), wherein the polyolefin resin emulsion is a nonionic polyalkylene wax emulsion.
(4) The aqueous inkjet ink composition according to any one of (1) to (3), wherein the content of the surfactant is 0.1 to 5 percent by mass in the aqueous inkjet ink composition.

Effects of the Invention

According to the aqueous inkjet ink composition proposed by the present invention, remarkable effects of achieving good performance in all of the following, namely, high-gap discharge stability, antifouling property, adhesion, drying property, abrasion resistance, preservation stability, and discharge stability, can be demonstrated even when the aqueous inkjet ink composition is printed on coated papers, polyvinyl chloride sheets and other nonabsorbent media.

BRIEF DESCRIPTION OF THE DRAWINGS

Mode for Carrying Out the Invention

The inventors of the present invention developed a novel aqueous inkjet ink composition by formulating it to contain in particular an alkali-soluble resin of 40 to 100° C. in glass transition temperature, a specific quantity of a polyolefin resin emulsion of 5 to 300 nm in average grain size, and an acetylenediol-based surfactant.

Use of this inkjet ink composition, especially when its alkali-soluble resin has the aforementioned glass transition temperatures, allows for improvement in high-gap discharge stability, antifouling property, and adhesion.

Additionally, use of this inkjet ink composition, especially when its polyolefin resin emulsion has the aforementioned average grain sizes, first and foremost allows good discharge stability to be maintained even when the ink is discharged from a fine-diameter nozzle under the inkjet printing method.

This means that, once the inkjet ink composition lands on the surface of the medium, the acetylenediol-based surfactant acts to lower the surface tension of the ink, promote wetting of the medium surface, and increase the surface area of the ink liquid film. As a result, the ink dries easily. Furthermore, the hydrophobic polyolefin resin emulsion, also helped by its grain size, can move to the top layer of the ink liquid film and demonstrate high abrasion resistance.

Accordingly, the inventors found that the aforementioned object could be achieved, and completed the present invention.

The aqueous inkjet ink composition proposed by the present invention is explained specifically below component by component.

(Pigment)

The aforementioned pigment may be any of various types of inorganic pigments and organic pigments generally used in inkjet recording liquids. To be specific, the aforementioned inorganic pigments include titanium oxide, red iron oxide, antimony red, cadmium yellow, cobalt blue, ultramarine blue, Prussian blue, carbon black, graphite, and other colored pigments (including white, black, and other achromatic coloring pigments), as well as calcium carbonate, kaolin, clay, barium sulfate, aluminum hydroxide, talc, and other extender pigments. The aforementioned organic pigments include soluble azo pigments, insoluble azo pigments, azo lake pigments, condensed azo pigments, copper phthalocyanine pigments, condensed polycyclic pigments, etc.

Any of the foregoing may be used alone, or two or more types may be used in combination.

Also, to be specific, the aforementioned pigment is preferably C. I. Pigment Red 5, 7, 12, 57:1, 122, 146, 202, 282, or other red pigment, C. I. Pigment Blue 1, 2, 15:3, 15:4, 16, 17, 60, or other blue pigment, C. I. Pigment Violet 19, C. I. Pigment Yellow 12, 13, 14, 17, 74, 83, 93, 128, 139, 151, 154, 155, 180, 185, 213, or other yellow pigment, or C. I. Black 7 (carbon black), and the like, from the viewpoint of enabling expression of vivid hue.

It should be noted that, under the present invention, a self-dispersing pigment constituted by pigment grains having polar functional groups introduced to their surface through chemical reaction, or coated pigment grains that are pigments coated with polymer grains, can also be used as the pigment. If a pigment other than the aforementioned self-dispersing pigment or coated pigment grains is used, it is better to formulate it into a pigment dispersion resin using the alkali-soluble resin and basic compound described below, to disperse the pigment in the aqueous medium.

The content of the aforementioned pigment in the aqueous inkjet ink composition proposed by the present invention is preferably 1.0 to 10 percent by mass, or more preferably 2.0 to 6.0 percent by mass.

(Alkali-Soluble Resin)

For the aforementioned alkali-soluble resin used under the present invention, any copolymer resin used for pigment dispersion in standard inks and paints, which is soluble in the aqueous medium in the presence of the basic compound, may be utilized.

As this alkali-soluble resin, a copolymer constituted by monomers having carboxyl groups, or preferably monomers containing hydrophobic groups for improving the adsorptivity with respect to the pigment, or a copolymer obtained by reacting such monomers together with other polymerizable monomers as necessary, may be utilized, for example.

The aforementioned monomers having carboxyl groups include, for example, acrylic acid, methacrylic acid, crotonic acid, itaconic acid, maleic acid, fumaric acid, 2-carboxyethyl (meth)acrylate, 2-carboxypropyl (meth)acrylate, maleic acid anhydride, maleic acid monoalkyl ester, citraconic acid, citraconic acid anhydride, citraconic acid monoalkyl ester, etc.

Also, the aforementioned monomers containing hydrophobic groups for improving the adsorptivity with respect to the pigment include, for example: monomers having long-chain alkyl groups such as alkyl esters of (meth)acrylic acids or other radical polymerizable unsaturated carboxylic acids having 8 or more carbon atoms (e.g., 2-ethylhexyl (meth) acrylate, octyl (meth)acrylate, lauryl (meth)acrylate, stearyl (meth)acrylate, 2-hydroxystearyl (meth)acrylate, etc.), alkyl vinyl ethers having 8 or more carbon atoms (e.g., dodecyl vinyl ether, etc.), and vinyl esters of fatty acids having 8 or more carbon atoms (e.g., vinyl 2-ethylhexanoate, vinyl laurate, vinyl stearate, etc.); monomers having alicyclic hydrocarbon groups such as cyclohexyl (meth)acrylate; and monomers having aromatic hydrocarbon groups such as benzyl (meth)acrylate, styrene, α-styrene, vinyl toluene, and other styrene monomers.

Also, the aforementioned other polymerizable monomers that may be used as necessary include methyl (meth)acrylate, ethyl (meth)acrylate, propyl (meth)acrylate, isopropyl (meth)acrylate, butyl (meth)acrylate, hexyl (meth)acrylate, and other (meth)acrylates, hydroxyethyl (meth)acrylate, acrylamide, N-methylol acrylamide, etc.

The alkali-soluble resin obtained by copolymerizing the aforementioned monomers is such that, when improvement of the solubility of the resin in the aqueous medium and prevention of drop in the water resistance of the printed matter are considered, its acid value is preferably 100 to 300 mg KOH/g, or more preferably 150 to 250 mgKOH/g. Also, its weight-average molecular weight is preferably 10,000 to 50,000, or more preferably 20,000 to 40,000. If the acid value of the alkali-soluble resin is lower than 100 mg KOH/g, the solubility of the resin in the aqueous medium tends to drop; if it exceeds 300 mg KOH/g, on the other hand, the water resistance of the printed matter tends to drop.

Also, from the viewpoint of high-gap discharge stability, antifouling property, and adhesion, the glass transition temperature of the alkali-soluble resin is 40 to 100° C., or preferably 45 to 95° C. If the glass transition temperature of the alkali-soluble resin is lower than 40° C., the high-gap discharge stability and antifouling property tend to drop; if it exceeds 100° C., on the other hand, the adhesion tends to drop.

Furthermore, when the abrasion resistance of the printed matter is to be improved further and the dispersibility of the pigment is also to be improved, the weight-average molecular weight of the alkali-soluble resin is preferably 10,000 to 50,000, or more preferably 20,000 to 30,000.

If the weight-average molecular weight of the alkali-soluble resin is lower than 10,000, the dispersion stability of the pigment and abrasion resistance of the obtained printed matter tend to drop; if it exceeds 50,000, on the other hand, the viscosity tends to increase, which is not desirable.

The content of the aforementioned alkali-soluble resin is preferably 10 to 60 parts by mass, or more preferably 15 to 50 parts by mass, relative to 100 parts by mass of the pigment contained in the aqueous inkjet ink composition. If the content of the alkali-soluble resin is lower than the aforementioned range, the dispersibility of the pigment in the aqueous medium tends to drop. If it exceeds the aforementioned range, on the other hand, the viscosity increases, which is not desirable.

Here, the glass transition temperature, acid value, and weight-average molecular weight of the aforementioned alkali-soluble resin can be obtained according to the following methods.

<Glass Transition Temperature>

Glass transition temperature refers to a theoretical glass transition temperature obtained by Wood's equation described below:

$$1/Tg = W_1/Tg_1 + W_2/Tg_2 + W_3/Tg_3 + \ldots + W_x/Tg_x \quad \text{Wood's equation:}$$

(In the equation, $Tg_1$ to $Tg_x$ represent the glass transition temperatures of the homopolymers comprising monomers 1, 2, 3, ..., x constituting the alkali-soluble resin, respectively, while $W_1$ to $W_x$ represent the polymerization fractions of monomers 1, 2, 3, ..., x, respectively, and Tg represents a theoretical glass transition temperature. It should be noted that, in Wood's equation, glass transition temperatures are absolute temperatures.)

<Acid Value>

Acid value refers to a theoretical acid value representing an arithmetically obtained quantity, based on the composition of monomers used to synthesize the alkali-soluble resin, of potassium hydroxide in milligrams needed, in theory, to neutralize 1 gram of alkali-soluble resin.

<Weight-Average Molecular Weight>

Weight-average molecular weight can be measured according to the gel permeation chromatography (GPC) method. As an example, it can be obtained as a polystyrene-equivalent weight-average molecular weight based on a chromatography performed using Waters 2690 (manufactured by Waters Corporation) as a GPC apparatus and PLgel 5 μm MIXED-D (manufactured by Polymer Laboratories Ltd.) as a column.

(Polyolefin Resin Emulsion)

The aforementioned polyolefin resin emulsion used under the present invention has an average grain size of 5 to 300 nm, or preferably 30 to 250 nm.

If the average grain size of the polyolefin resin emulsion is smaller than 5 nm, the abrasion resistance drops; if it exceeds 300 nm, on the other hand, the discharge stability of the aqueous inkjet ink composition drops, which is not desirable.

Specific examples of such polyolefin resin emulsion include AQUACER 515 (average grain size 40 nm, manufactured by BYK Japan KK), AQUACER 531 (average grain size 160 nm, manufactured by BYK Japan KK), AQUACER 539 (average grain size 50 nm, manufactured by BYK Japan KK), and HORDAMER PE03 (average grain size 240 nm, manufactured by BYK Japan KK).

The average grain sizes of the aforementioned polyolefin resin emulsions are values measured according to the dynamic light-scattering method using a Microtrac UPA particle-size analyzer manufactured by Nikkiso Co., Ltd.

In the aqueous inkjet ink composition proposed by the present invention, the content of the polyolefin resin emulsion is preferably 0.1 to 10.0 percent by mass, or more preferably 0.5 to 5.0 percent by mass, or even more preferably 1.0 to 3.0 percent by mass, in solids content, in the inkjet ink composition.

If the content of the polyolefin resin emulsion is lower than 0.1 percent by mass in solids content, the abrasion resistance tends to drop; if it exceeds 10 percent by mass, on the other hand, the discharge stability of the aqueous inkjet ink composition drops, which is not desirable.

(Basic Compound)

Specific examples of the aforementioned basic compound used under the present invention include sodium hydroxide, potassium hydroxide, and other alkali metal hydroxides, as well as methylamine, ethylamine, monoethanolamine, N,N-dimetylethanolamine, N,N-diethylethanolamine, N,N-dibuty- lethanolamine, diethanolamine, N-methyldiethanolamine, triethanolamine, morpholine, N-methylmorpholine, N-ethylmorpholine, and other organic basic compounds. Any of the foregoing may be used alone, or two or more types may be used in combination.
(Aqueous Medium)

The aqueous medium used in the aqueous inkjet ink composition proposed by the present invention may be an aqueous medium constituted by water and water-soluble organic solvent.

The aforementioned water is preferably ion-exchanged water or distilled water from which metal ions, etc., have been removed.

Also, it may be possible to impart superior inkjet printability in terms of preservation stability, discharge stability, ink jetting property, etc., when a water-soluble organic solvent is contained. Such water-soluble organic solvent may be, for example, any of monoalcohols, polyalcohols, lower alkyl ethers of polyalcohols, ketones, ethers, esters, nitrogen-containing compounds, etc. Any of the foregoing may be used alone, or two or more types may be used in combination.

Specific examples of the aforementioned monoalcohols include methanol, ethanol, n-propanol, n-butanol, n-pentanol, n-hexanol, n-heptanol, n-octanol, n-nonyl alcohol, n-decanol, and isomers thereof, cyclopentanol, cyclohexanol, etc., where alcohols containing an alkyl group having 1 to 6 carbon atoms are preferred.

Specific examples of the aforementioned polyalcohols include ethylene glycol, propylene glycol, 1,3-butylene glycol, 1,4-butylene glycol, 1,2-pentanediol, 1,5-pentanediol, neopentyl glycol, 1,2-hexanediol, 1,6-hexanediol, 1,2-cyclohexanediol, heptanediol, 1,8-octanediol, 1,9-nonanediol, 1,10-decanediol, glycerin, pentaerythritol, diethylene glycol, dipropylene glycol, triethylene glycol, tetraethylene glycol, polyethylene glycol, polypropylene glycol, thiodiglycol, etc.

Specific examples of the aforementioned lower alkyl ethers of polyalcohols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, dipropylene glycol mono-n-propyl ether, dipropylene glycol mono-n-butyl ether, etc.

Specific examples of the aforementioned ketones include acetone, methyl ethyl ketone, methyl butyl ketone, methyl isobutyl ketone, diisopropyl ketone, cyclopentanone, cyclohexanone, etc.

Specific examples of the aforementioned ethers include isopropyl ether, n-butyl ether, tetrahydrofuran, tetrahydropyran, 1,4-dioxane, etc.

The aforementioned esters include propylene carbonate, methyl acetate, ethyl acetate, propyl acetate, isopropyl acetate, butyl acetate, isobutyl acetate, amyl acetate, ethyl lactate, ethyl butylate, dibutyl phthalate, dioctyl phthalate, as well as cyclic esters such as ε-caprolactone and ε-caprolactam.

The aforementioned nitrogen-containing compounds include urea, pyrrolidone, N-methyl-2-pyrrolidone, octyl pyrrolidone, etc.

The content of the aforementioned water-soluble organic solvent is not limited in any way, but is preferably 15 to 50 percent by mass in the aqueous inkjet ink composition.

(Surfactant)

The surfactant used under the present invention is a compound having an acetylenediol framework. Examples of such surfactant include SURFYNOL 104 Series manufactured by Air Products Inc. To be more specific, SURFYNOL 104E, SURFYNOL 104H, SURFYNOL 104A, SURFYNOL 104BC, SURFYNOL 104DPM, SURFYNOL 104PA, SURFYNOL 104 PG-50, SURFYNOL 420, SURFYNOL 440, as well as OLFINE E1004, OLFINE E1010, OLFINE E1020, OLFINE PD-001, OLFINE PD-002W, OLFINE PD-004, OLFINE PD-005, OLFINE EXP. 4001, OLFINE EXP. 4200, OLFINE EXP. 4123, and OLFINE EXP. 4300 manufactured by Nissin Chemical Industry Co., Ltd., may be used, for example. Any of the foregoing may be used alone, or two or more types may be used in combination.

The content of the aforementioned surfactant is preferably 0.1 to 10 percent by mass, or more preferably 0.1 to 5.0 percent by mass, in the aqueous inkjet ink composition.
(Additives)

Furthermore, known additives such as pigment dispersant, antifungal agent, rustproof agent, thickening agent, antioxidant, UV absorbent, storability improving agent, defoaming agent, pH adjuster, etc., may also be added, according to the purpose, to the aqueous inkjet ink composition proposed by the present invention.
(Methods for Manufacturing Aqueous Inkjet Ink Composition)

Methods for manufacturing the aqueous inkjet ink composition proposed by the present invention, using the above constituents, include the following:

(1) a method for preparing the aqueous inkjet ink composition by mixing the pigment, the aqueous resin varnish prepared by dissolving the alkali-soluble resin in water in the presence of the basic compound, and the pigment dispersant, etc., as necessary, and then dispersing the pigment using any of various dispersion machines such as ball mill, attritor, roll mill, sand mill, or agitator mill, for example, and further adding the remaining materials (hereinafter referred to as "Manufacturing Method 1"); and (2) a method for preparing the aqueous inkjet ink composition by dispersing the pigment according to the aforementioned method, and then using the acid deposition method, or the ion exchange means described in Domestic Re-publication of International Patent Laid-open No. WO2005/116147, for example, to obtain a resin-coated pigment constituted by the pigment whose surface has been deposited with the alkali-soluble resin, followed by neutralizing the obtained resin-coated pigment with the basic compound, redispersing the result in water using any of various dispersion machines (high-speed agitation device, etc.), and further adding the remaining materials (hereinafter referred to as "Manufacturing Method 2").

Of the two, Manufacturing Method 2 is preferred because the aqueous inkjet ink composition will have better preservation stability.

The thus obtained aqueous inkjet ink composition proposed by the present invention has an initial post-manufacturing viscosity in a range of 2.0 to 10.0 mPa·s, or preferably 3.0 to 7.0 mPa·s.
(Printing Method)

Next, the printing method using the aqueous inkjet ink composition proposed by the present invention is explained.

For the printing media used with the aqueous inkjet ink composition proposed by the present invention, plain papers, offset papers, and other uncoated papers can be utilized in addition to art papers, special inkjet papers, glossy inkjet papers, and other coated papers, or polyvinyl chloride sheets and other plastic base materials, etc.

Then, inkjet printing can be performed by, for example, charging the aforementioned aqueous inkjet ink composition proposed by the present invention in an ink cartridge, installing the ink cartridge in a single-pass type or other inkjet recording device, and then ejecting the ink composition from the nozzle onto the aforementioned base printing material.

EXAMPLES

The present invention is explained in greater detail below by citing examples; however, the present invention is not limited to these examples. It should be noted that, unless otherwise specified, "part(s)" means "part(s) by mass," while "percent" means "percent by mass."

<Aqueous Resin Varnishes 1 to 5>

Twenty parts by mass of an acrylic acid/lauryl acrylate/styrene copolymer of 70° C. in glass transition temperature, 30,000 in weight-average molecular weight, and 185 mg KOH/g in acid value, were dissolved in a mixed solution comprising 2.5 parts by mass of potassium hydroxide and 77.5 parts by mass of water, to obtain aqueous resin varnish 1, of 20 percent in solids content.

Twenty parts by mass of an acrylic acid/lauryl acrylate/styrene copolymer of 45° C. in glass transition temperature, 30,000 in weight-average molecular weight, and 185 mg KOH/g in acid value, were dissolved in a mixed solution comprising 2.5 parts by mass of potassium hydroxide and 77.5 parts by mass of water, to obtain aqueous resin varnish 2, of 20 percent in solids content.

Twenty parts by mass of an acrylic acid/lauryl acrylate/styrene copolymer of 95° C. in glass transition temperature, 30,000 in weight-average molecular weight, and 185 mg KOH/g in acid value, were dissolved in a mixed solution comprising 2.5 parts by mass of potassium hydroxide and 77.5 parts by mass of water, to obtain aqueous resin varnish 3, of 20 percent in solids content.

Twenty parts by mass of an acrylic acid/lauryl acrylate/styrene copolymer of 30° C. in glass transition temperature, 30,000 in weight-average molecular weight, and 185 mg KOH/g in acid value, were dissolved in a mixed solution comprising 2.5 parts by mass of potassium hydroxide and 77.5 parts by mass of water, to obtain aqueous resin varnish 4, of 20 percent in solids content.

Twenty parts by mass of a methacrylic acid/lauryl acrylate/styrene copolymer of 110° C. in glass transition temperature, 30,000 in weight-average molecular weight, and 185 mg KOH/g in acid value, were dissolved in a mixed solution comprising 2.5 parts by mass of potassium hydroxide and 77.5 parts by mass of water, to obtain aqueous resin varnish 5, of 20 percent in solids content.

<Preparation of Aqueous Black Ink Bases 1 to 5>

Resin varnishes for pigment dispersion were prepared by adding 64.3 parts by mass of water to 23.7 parts by mass of each of aqueous resin varnishes 1 to 5 above, followed by mixing. To each of these varnishes, 12 parts by mass of a carbon black (product name PRINTEX 90, manufactured by Degussa AG) were further added, followed by mixing under agitation and kneading in a wet circulation mill, to prepare aqueous black ink bases 1 to 5.

<Preparation of Aqueous Yellow Ink Base>

A resin varnish for pigment dispersion was prepared by adding 64.3 parts by mass of water to 23.7 parts by mass of aqueous resin varnish 2 above, followed by mixing. To this varnish, 12 parts by mass of a yellow pigment (product name NOVOPERM Yellow 4G01, manufactured by Clariant AG) were further added, followed by mixing under agitation and kneading in a wet circulation mill, to prepare an aqueous yellow ink base.

<Preparation of Aqueous Magenta Ink Base>

A resin varnish for pigment dispersion was prepared by adding 64.3 parts by mass of water to 23.7 parts by mass of aqueous resin varnish 2 above, followed by mixing. To this varnish, 12 parts by mass of a magenta pigment (product name Ink Jet Magenta E5B02, manufactured by Clariant AG) were further added, followed by mixing under agitation and kneading in a wet circulation mill, to prepare an aqueous magenta ink base.

<Preparation of Aqueous Cyan Ink Base>

A resin varnish for pigment dispersion was prepared by adding 64.3 parts by mass of water to 23.7 parts by mass of aqueous resin varnish 2 above, followed by mixing. To this varnish, 12 parts by mass of a cyan pigment (product name HELIOGEN Blue L7101F, manufactured by BASF SE) were further added, followed by mixing under agitation and kneading in a wet circulation mill, to prepare an aqueous cyan ink base.

<Preparation of Aqueous White Ink Base>

A resin varnish for pigment dispersion was prepared by adding 40.0 parts by mass of water to 20.0 parts by mass of aqueous resin varnish 2 above, followed by mixing. To this varnish, 40 parts by mass of a titanium oxide pigment (product name CR-50, manufactured by Ishihara Sangyo Kaisha, Ltd.) were further added, followed by mixing under agitation and kneading in a wet circulation mill, to prepare an aqueous white ink base.

<Polyolefin Resin Emulsions>

AQUACER 531 (solids content 45 percent, polyethylene resin emulsion, average grain size 160 nm, manufactured by BYK Japan KK)

AQUACER 515 (solids content 35 percent, polyethylene resin emulsion, average grain size 40 nm, manufactured by BYK Japan KK)

HORDAMER PE03 (solids content 35 percent, polyethylene resin emulsion, average grain size 240 nm, manufactured by BYK Japan KK)

CHEMIPEARL S300 (solids content 35 percent, polyethylene-based ionomer resin emulsion, average grain size 500 nm, manufactured by Mitsui Chemicals, Inc.)

CHEMIPEARL WP100 (solids content 40 percent, polypropylene resin emulsion, average grain size 1,000 nm, manufactured by Mitsui Chemicals, Inc.)

<Surfactant>

SURFYNOL 104PG50 (solids content 50 percent, acetylenediol-based surfactant, manufactured by Nissin Chemical Industry Co., Ltd.)

OLFINE E1004 (solids content 100 percent, ethylene oxide adduct of acetylenediol-based surfactant, manufactured by Nissin Chemical Industry Co., Ltd.)

BYK-347 (solids content 100 percent, polyether-modified siloxane surfactant, manufactured by BYK Japan KK)

<Aqueous Inkjet Ink Compositions in Examples 1 to 15 and Comparative Examples 1 to 6>

The aforementioned aqueous ink bases of respective colors, the aforementioned polyolefin resin emulsions, the aforementioned surfactants, propylene glycol, and water, were mixed under agitation to achieve the percentages by mass in Table 1, to obtain the aqueous inkjet ink compositions in Examples 1 to 15 and Comparative Examples 1 to 6.

<Printing Evaluation of Aqueous Inkjet Ink Compositions>

The aqueous inkjet ink compositions were evaluated according to the evaluation methods below, and their results are shown in Table 1.

(Discharge Stability)

The aqueous inkjet ink compositions in Examples 1 to 15 and Comparative Examples 1 to 6 were each charged in a cartridge for an evaluation printer equipped with a head manufactured by Epson Corporation, and printed on an OK top-coated paper (manufactured by Oji Paper Co., Ltd.) by adjusting the distance between the ink discharge nozzle and the printing medium to 1 mm and 3 mm, to evaluate the discharge stability.

Evaluation Criteria

○: Discharge is stable and does not disturb printing.

Δ: Discharged, but printing is somewhat disturbed.

X: Discharge is unstable and disturbs printing.

(Drying Property)

The aqueous inkjet ink compositions in Examples 1 to 15 and Comparative Examples 1 to 6 were each charged in a cartridge for an evaluation printer equipped with a head manufactured by Epson Corporation, and printed on an OK top-coated paper (manufactured by Oji Paper Co., Ltd.) by adjusting the distance between the ink discharge nozzle and the printing medium to 1 mm, after which the printed matter was let stand for 1 minute at 80° C. to dry the ink, and the printed part was rubbed with a cotton swab to evaluate the drying property.

Evaluation Criteria

○: No ink attaches to the cotton swab.

Δ: A small amount of ink attaches to the cotton swab.

X: A large amount of ink attaches to the cotton swab.

(Abrasion Resistance)

The aqueous inkjet ink compositions in Examples 1 to 15 and Comparative Examples 1 to 6 were each charged in a cartridge for an evaluation printer equipped with a head manufactured by Epson Corporation, and printed on an OK top-coated paper (manufactured by Oji Paper Co., Ltd.) by adjusting the distance between the ink discharge nozzle and the printing medium to 1 mm, after which each printed matter was cut to a sample piece of 2.5 cm×25 cm and rubbed 50 times against pad paper which was the same as the one used for each printing with a load of 200 g using a Gakushin-type abrasion resistance tester, and the rubbed part was evaluated based on peeling of paper on the surface of the sample piece and fouling of the pad paper.

Evaluation Criteria

○: At the rubbed part, there is no peeling of paper on the surface of the sample piece and the pad paper is not fouled, either.

Δ: At the rubbed part, there is no peeling of paper on the surface of the sample piece but the pad paper is slightly fouled.

X: At the rubbed part, there is peeling of paper on the surface of the sample piece and the pad paper is fouled.

(Preservation Stability of Aqueous Inkjet Ink Compositions)

The aqueous inkjet ink compositions in Examples 1 to 15 and Comparative Examples 1 to 6 were each taken into a glass vial and measured for viscosity at 25° C. using a viscometer (Model RE100L, manufactured by Toki Sangyo Co., Ltd.). Thereafter, the vial was sealed, preserved for 1 month, and then measured for viscosity after preservation (25° C.) using a viscometer. Preservation stability was evaluated based on the rate of change in viscosity (Viscosity after 1 month of preservation at 60° C.–Viscosity before preservation/Viscosity before preservation).

Evaluation Criteria

○: The rate of change in viscosity is lower than 5 percent.

Δ: The rate of change in viscosity is 5 percent or higher, but lower than 10 percent.

X: The rate of change in viscosity is 10 percent or higher, but lower than 30 percent.

(Antifouling Property)

The aqueous inkjet ink compositions in Examples 1 to 15 and Comparative Examples 1 to 6 were each charged in a cartridge for an evaluation printer equipped with a head manufactured by Epson Corporation, and printed on an OK top-coated paper (manufactured by Oji Paper Co., Ltd.) by adjusting the distance between the ink discharge nozzle and the printing medium to 1 mm, after which the printed matter was dried and let stand for 1 month with its printed surface facing up. Thereafter, the printed surface was wiped with a nonwoven fabric wipe to remove dust first, and then observed to evaluate antifouling property.

Evaluation Criteria

○: No dust is attached.

Δ: A small quantity of dust remains.

X: A large quantity of dust remains.

(Adhesion)

The aqueous inkjet ink compositions in Examples 1 to 15 and Comparative Examples 1 to 6 were each charged in a cartridge for an evaluation printer equipped with a head manufactured by Epson Corporation, and printed on an OK top-coated paper (manufactured by Oji Paper Co., Ltd.) by adjusting the distance between the ink discharge nozzle and the printing medium to 1 mm, after which a piece of cellophane tape was stuck to the printed surface and then peeled, to evaluate adhesion based on the ratio of the area where the ink film had peeled from the adherend.

Evaluation Criteria

○: Not peeled at all.

Δ: The peeled area is smaller than 20 percent.

X: The peeled area is 20 percent or larger.

TABLE 1

|  |  | Examples |  |  |  |  |  |  |  |  |  |  |
|---|---|---|---|---|---|---|---|---|---|---|---|---|
|  |  | 1 | 2 | 3 | 4 | 5 | 6 | 7 | 8 | 9 | 10 | 11 |
| Black ink base 1 |  | 33.3 |  |  |  |  |  |  | 33.3 | 33.3 | 33.3 | 33.3 |
| Black ink base 2 |  |  | 33.3 |  |  |  |  |  |  |  |  |  |
| Black ink base 3 |  |  |  | 33.3 |  |  |  |  |  |  |  |  |
| Black ink base 4 |  |  |  |  |  |  |  |  |  |  |  |  |
| Black ink base 5 |  |  |  |  |  |  |  |  |  |  |  |  |
| Yellow ink base |  |  |  |  |  | 33.3 |  |  |  |  |  |  |
| Magenta ink base |  |  |  |  |  |  | 33.3 |  |  |  |  |  |
| Cyan ink base |  |  |  |  |  |  |  | 33.3 |  |  |  |  |
| White ink base |  |  |  |  |  |  |  |  | 25.0 |  |  |  |
| Polyolefin resin emulsion | AQUACER531 | 3.0 | 3.0 | 3.0 | 3.0 | 3.0 | 3.0 | 3.0 | 3.0 | 3.0 | 4.0 | 4.0 |
|  | AQUACER515 |  |  |  |  |  |  |  |  |  |  |  |
|  | HORDAMER PE03 |  |  |  |  |  |  |  |  |  |  |  |
|  | CHEMIPEARL S300 |  |  |  |  |  |  |  |  |  |  |  |
|  | CHEMIPEARL WP100 |  |  |  |  |  |  |  |  |  |  |  |

TABLE 1-continued

| | | | | | | | | | | | | |
|---|---|---|---|---|---|---|---|---|---|---|---|---|
| Surfactant | SURFYNOL 104PG50 | 2.0 | 2.0 | 2.0 | 2.0 | 2.0 | 2.0 | 2.0 | | 2.0 | 2.0 | 2.0 |
| | OLFINE E1004 | | | | | | | | 1.0 | | | |
| | BYK-347 | | | | | | | | | 0.1 | | |
| Aqueous medium | Propylene glycol | 25.0 | 25.0 | 25.0 | 28.0 | 27.0 | 30.0 | 26.0 | 26.0 | 25.0 | 20.0 | 26.0 |
| | Water | 36.7 | 36.7 | 36.7 | 33.7 | 34.7 | 31.7 | 44.0 | 36.7 | 36.6 | 40.7 | 34.7 |
| Total | | 100 | 100 | 100 | 100 | 100 | 100 | 100 | 100 | 100 | 100 | 100 |
| Viscosity (mPa · s) | | 5.0 | 5.0 | 5.0 | 5.0 | 5.0 | 5.0 | 5.0 | 5.0 | 5.0 | 3.0 | 6.0 |
| Surface tension (dyn) | | 28.0 | 28.0 | 28.0 | 28.0 | 28.0 | 28.0 | 28.0 | 29.0 | 26.0 | 28.0 | 28.0 |
| Preservation stability | | ○ | ○ | ○ | ○ | ○ | ○ | ○ | ○ | ○ | ○ | ○ |
| Discharge stability (gap 1 mm) | | ○ | ○ | ○ | ○ | ○ | ○ | ○ | ○ | ○ | ○ | ○ |
| High-gap discharge stability (gap 3 mm) | | ○ | ○ | ○ | ○ | ○ | ○ | ○ | ○ | ○ | ○ | ○ |
| Drying property | | ○ | ○ | ○ | ○ | ○ | ○ | ○ | ○ | ○ | ○ | ○ |
| Abrasion resistance | | ○ | ○ | ○ | ○ | ○ | ○ | ○ | ○ | ○ | ○ | ○ |
| Antifouling property | | ○ | ○ | ○ | ○ | ○ | ○ | ○ | ○ | ○ | ○ | ○ |
| Adhesion | | ○ | ○ | ○ | ○ | ○ | ○ | ○ | ○ | ○ | ○ | ○ |

| | | Examples | | | | Comparative Examples | | | | | |
|---|---|---|---|---|---|---|---|---|---|---|---|
| | | 12 | 13 | 14 | 15 | 1 | 2 | 3 | 4 | 5 | 6 |
| Black ink base 1 | | 33.3 | 33.3 | 33.3 | 33.3 | 33.3 | 33.3 | 33.3 | | | |
| Black ink base 2 | | | | | | | | | | | |
| Black ink base 3 | | | | | | | | | | | |
| Black ink base 4 | | | | | | | | | | 33.3 | |
| Black ink base 5 | | | | | | | | | | | 33.3 |
| Yellow ink base | | | | | | | | | | | |
| Magenta ink base | | | | | | | | | | | |
| Cyan ink base | | | | | | | | | | | |
| White ink base | | | | | | | | | | | |
| Polyolefin resin emulsion | AQUACER531 | 1.0 | 5.0 | | | 10.0 | | | 3.0 | 3.0 | 3.0 |
| | AQUACER515 | | | 3.9 | | | | | | | |
| | HORDAMER PE03 | | | | 3.9 | | | | | | |
| | CHEMIPEARL S300 | | | | | | 3.9 | | | | |
| | CHEMIPEARL WP100 | | | | | | | 3.4 | | | |
| Surfactant | SURFYNOL 104PG50 | 2.0 | 2.0 | 2.0 | 2.0 | 2.0 | 2.0 | 2.0 | | 2.0 | 2.0 |
| | OLFINE E1004 | | | | | | | | | | |
| | BYK-347 | | | | | | | | 1.0 | | |
| Aqueous medium | Propylene glycol | 27.0 | 23.0 | 25.0 | 25.0 | 20.0 | 25.0 | 25.0 | 25.0 | 25.0 | 25.0 |
| | Water | 36.7 | 36.7 | 35.8 | 35.8 | 34.7 | 35.8 | 36.3 | 37.7 | 36.7 | 36.7 |
| Total | | 100 | 100 | 100 | 100 | 100 | 100 | 100 | 100 | 100 | 100 |
| Viscosity (mPa · s) | | 5.0 | 5.0 | 5.0 | 5.0 | 7.0 | 5.0 | 5.0 | 5.0 | 5.0 | 5.0 |
| Surface tension (dyn) | | 28.0 | 28.0 | 28.0 | 28.0 | 28.0 | 28.0 | 28.0 | 26.0 | 28.0 | 28.0 |
| Preservation stability | | ○ | ○ | ○ | ○ | Δ | ○ | ○ | ○ | Δ | Δ |
| Discharge stability (gap 1 mm) | | ○ | ○ | ○ | ○ | X | X | X | Δ | ○ | ○ |
| High-gap discharge stability (gap 3 mm) | | ○ | Δ | ○ | ○ | X | X | X | X | X | ○ |
| Drying property | | ○ | ○ | ○ | ○ | — | — | — | Δ | Δ | ○ |
| Abrasion resistance | | Δ | ○ | ○ | ○ | — | — | — | ○ | Δ | Δ |
| Antifouling property | | ○ | ○ | ○ | ○ | — | — | — | ○ | X | ○ |
| Adhesion | | ○ | ○ | ○ | ○ | — | — | — | ○ | ○ | X |

Examples 1 to 15 show that the ink compositions conforming to the present invention have low initial viscosity, appropriate surface tension, and excellent preservation stability, discharge stability, drying property, abrasion resistance, high-gap discharge stability, antifouling property, and adhesion.

With respect to these properties, the results of Examples 1 and 4 to 7 show that they are not affected by the type of pigment, while the results of Examples 1, 8, and 9 show that the properties remain stable regardless of changes to the type and content of acetylenediol-based surfactant or other additives.

Also, the results of Examples 1, 10 and 11 show that the properties remain stable regardless of changes to the composition of the aqueous medium.

Furthermore, the results of Examples 1 and 12 to 15 show that, so long as the average grain size and content of the polyolefin resin emulsion vary within specified ranges, the aqueous inkjet ink compositions conforming to the present invention ensure that each of the properties is good and remains stable without being affected by the concentration of this component.

By contrast, the result of Comparative Example 1 shows that the preservation stability and discharge stability worsen when the content of the polyolefin resin emulsion is made excessive.

Also, as shown by Comparative Examples 2 and 3, the discharge stability worsens when a polyolefin resin emulsion whose grain size is larger than a specified range is used.

In Comparative Examples 1 to 3 above, printed matters could not be obtained due to worsening of discharge stability, and consequently drying property, abrasion resistance, antifouling property, and adhesion could not be evaluated.

The result of Comparative Example 4 shows that the high-gap discharge stability worsens when no acetylenediol-based surfactant is contained.

The result of Comparative Example 5 shows that the high-gap discharge stability and antifouling property worsen when an alkali-soluble resin whose glass transition temperature is below 40° C. is used.

The result of Comparative Example 6 shows that the adhesion worsens when an alkali-soluble resin whose glass transition temperature exceeds 100° C. is used.

What is claimed:

1. An aqueous inkjet ink composition containing a pigment, an alkali-soluble resin, a polyolefin resin emulsion, a basic compound, an aqueous medium, and a surfactant, wherein
   the alkali-soluble resin is a copolymer of acrylic acid/lauryl acrylate/styrene,
   a glass transition temperature of the alkali-soluble resin is 45° C. to 95° C.,
   an average grain size of the polyolefin resin emulsion is 5 to 300 nm,
   a solids content of the polyolefin resin emulsion is 0.5 to 5.0 percent by mass in the aqueous inkjet ink composition, and
   the surfactant contains at least an acetylenediol-based surfactant.

2. The aqueous inkjet ink composition according to claim 1, wherein a content of the pigment is 2.0 to 6.0 percent by mass in the aqueous inkjet ink composition.

3. The aqueous inkjet ink composition according to claim 1, wherein the polyolefin resin emulsion is a nonionic polyalkylene wax emulsion.

4. The aqueous inkjet ink composition according to claim 1, wherein a content of the surfactant is 0.1 to 5.0 percent by mass in the aqueous inkjet ink composition.

5. The aqueous inkjet ink composition according to claim 1, which is used in an inkjet recording device having a gap between an inkjet nozzle and a printing material, which is 3 mm or more.

6. An aqueous inkjet ink composition used in an inkjet recording device having a gap between an inkjet nozzle and a printing material, which is 3 mm or more, said aqueous inkjet ink composition containing a pigment, an alkali-soluble resin, a polyolefin resin emulsion, a basic compound, an aqueous medium, and a surfactant, wherein
   a glass transition temperature of the alkali-soluble resin is 45° C. to 95° C.,
   an average grain size of the polyolefin resin emulsion is 5 to 300 nm,
   a solids content of the polyolefin resin emulsion is 0.5 to 5.0 percent by mass in the aqueous inkjet ink composition, and
   the surfactant contains at least an acetylenediol-based surfactant.

* * * * *